United States Patent Office 2,834,814
Patented May 13, 1958

2,834,814

PREPARATION OF VERBENYL ETHERS

Joseph P. Bain, Wilbur Y. Gary, and Albert B. Booth, Jacksonville, Fla., assignors to The Glidden Company, Cleveland, Ohio, a corporation of Ohio No Drawing. Application July 15, 1953
Serial No. 368,208

14 Claims. (Cl. 260—611)

This invention is concerned with verbenyl ethers, methods for their preparation, and uses thereof.

Verbenol can be prepared by the oxidation of α-pinene as is known to the prior art.

Ethers of verbenol are novel compounds of pleasant odor which possess excellent solvent action, and are, therefore, useful in solvents, cleaner, textile processing and wetting-out preparations. We have found that they are also valuable as intermediates in the synthesis of menthol and other compounds known to be present in essential oils and which possess known valuable properties. Verbenyl ethers are also convertible to new types of compounds difficult of access by conventional syntheses.

Accordingly, an object of this invention is the preparation of verbenyl ethers.

Another object is to provide a process for the preparation of verbenyl ethers from verbenol.

Another object is to provide a process for conversion of 3-pinene-2-ol, the allylomer of verbenol, to verbenyl ethers.

Another object is the preparation of optically active verbenyl ethers.

Another object is the preparation of verbanyl ethers.

Another object is the preparation of verbenyl phenols.

Another object is to prepare a new series of valuble terpene ethers.

Another object is to prepare intermediates valuable for conversion to members of the p-menthane family and possessing an oxygen atom located at the 3-position.

Other objects will be apparent to those skilled in the art.

We have found that verbenyl ethers are readily produced by reacting verbenol with an alcohol. The reaction takes place readily when the alcohol, which may be monohydric, polyhydric, aromatic, aliphatic, alicyclic, etc., is heated with verbenol even without a catalyst. However, the reaction proceeds very satisfactorily and in excellent yield when the mixture of verbenol and other alcohol is treated with an acid catalyst and at room temperature or above. Suitable acid catalysts are of the acidic type such as sulfuric acid, boron fluoride, zinc chloride, etc. Only small quantities of catalyst need be used, and since heat alone will bring about the reaction, it is evident that the catalyst need not be particularly chosen for unique properties and that strong catalysts may be employed at low temperatures, weaker catalysts at higher temperatures, etc.

In our copending application, Serial No. 352,291, filed April 30, 1953, we have shown that 3-pinene-2-ol can be obtained by working up products resulting from gaseous oxygen oxidation of α-pinene under certain conditions, and that 3-pinene-2-ol is the allylomer of verbenol. We have now found that 3-pinene-2-ol can be employed in producing verbenyl ethers and can therefore be employed in whole or part replacement of the verbenol. We do find, however, that it is best employed where some acidity is present, in general, sufficient acidity may exist without addition of catalyst. This may be due to traces of acidity, including moisture, in the alcohol chosen for the reaction, and is particularly so when the alcohol is itself somewhat acidic, as in the case of phenols.

Where strong acids, boron fluoride or acid salts, etc. are employed as catalysts, it will be found advantageous to neutralize the reaction mixture prior to distillation, to wash it with water or apply other such treatments or combination of treatments in order to avoid the decomposition of the ether during distillation which may be induced by the presence of such catalysts of acidic type.

The formation of verbenyl ethers proceeds according to the following scheme:

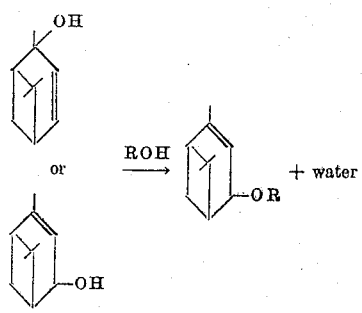

and as stated above, R may be alkyl, aryl, aralkyl, alicyclic, etc.

Verbenyl ethers can also be produced by various modifications of the Williamson synthesis, but such a synthesis is far more expensive, and is therefore not as practical to employ as our preferred method of simply reacting verbenol or 3-pinene-2-ol with the appropriate alcohol.

The alcohol employed can contain functional groups other than the hydroxyl group to be converted to the ether linkage. Thus, diethylene glycol would yield the the monoverbenyl-mono-β-hydroxy ethyl ether of ethylene glycol and β-methoxy ethanol would yield with verbenol verbenyl-β-methoxy ethyl ether. Other substituted alcohols such as halogenated alcohols would yield verbenyl ethers containing reactive halogen, etc. Such verbenyl ether alcohols, verbenyl ether halides, etc. would be suited to special uses and could serve as intermediates for special types of syntheses.

Verbenyl ethers can be hydrogenated readily to the corresponding verbanyl ethers which possess enhanced stability to light, air and chemical reagents.

The verbenyl phenyl ethers undergo rearrangement when heated to yield the corresponding verbenyl phenols, i. e.,

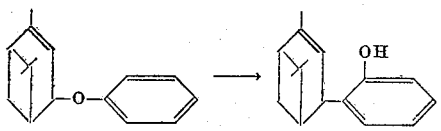

Such verbenyl phenols react readily with formaldehyde to form resins and can be sulfonated, hydrogenated, etc. to form novel materials.

The verbenyl ethers can be prepared in optically active or inactive forms at will by choice of verbenol or 3-pinene-2-ol of proper optical sign and magnitude of optical sign. For many applications, optical activity of the verbenyl ether is not important, but where the verbenyl ether is to be employed as an intermediate in the synthesis of, say, optically active menthol, then it is advantageous to start with an optically active pinene alcohol, make the optically active verbenyl ether and convert it to the optically active menthol which possesses unique properties associated with its degree and sign of optical activity. Thus, an optically active verbenyl ether can be subjected to pyrolysis to form optically active isopiperitenyl ether among other products, and it or its hydrogenation products can be split to form optically active alcohols of the p-menthane family oxygenated at the 3-position and related products.

Both verbenol and 3-pinene-2-ol exist as cis-trans as well as optically active forms, and the exact method employed in forming the verbenyl ether plays an important part in determining the configuration obtained, but we believe the ethers obtained using our preferred procedure largely consist of the trans-form irrespective of the form of the starting pinene alcohol.

It will be appreciated that the pure pinene alcohols need not be employed in preparing verbenyl ethers. Thus, we may employ relatively crude pinene alcohol mixtures such as those which result from working up the products resulting from air oxidation of α-pinene. Such crude material may be fractionated, if desired, to remove unoxidized pinene, and the fraction boiling at about 75 to 100° C., at 10 mm., may be selected for conversion to an ether by our present process. Since the total verbenyl values, i. e., the total verbenol and 3-pinene-2-ol, can be isolated as a single compound, which can be made to boil much lower or much higher than verbenol itself, depending on the identity of the alcohol chosen for etherification therewith, it is evident that pure verbenyl ethers can be produced from relatively impure pinene alcohols and that use of such a procedure results in a relatively simple concentration and separation of total verbenyl values.

Verbenyl ethers can be oxidized to verbenone with chromic acid, if desired.

It is well known that each organic compound possesses a unique infrared spectrum and that therefore it may be distinguished from all other compounds including its isomers by examination of its spectrum in the infrared region by means of the infrared spectrophotometer which is commercially available and is now a widely employed laboratory instrument. It is also well known that quantitative analyses may be performed by well recognized, accurate and established infrared spectrophotometric procedures. Since certain functional groups, practically irrespective of the nature of the remainder of the molecule, exhibit absorptions in the infrared region of the spectrum at characteristic wavelengths, it is practical to analyze for such groups as carbonyl, an ether linkage, hydroxyl, $CH_2=C<$, etc. qualitatively, and, in the absence of certain structural features in the molecule which modify the character of the absorption, more or less quantitatively. Thus, a homologous series of compounds or a group of compounds containing a specific arrangement of atoms which exhibits one or more characteristic absorption bands yield spectra which are similar with respect to appearance of certain absorption bands common to that series of compounds.

We have found that compounds containing the verbenyl group exhibit such characteristic and unique absorption bands and therefore infrared spectrophotometric analysis for these bands may be employed to detect this group within a molecule. The wavelengths of these characteristic verbenyl bands of medium to fairly high optical density are shown in Table I which shows the wavelengths which are common to the verbenyl compounds listed. The band at 6.03μ is especially useful for detecting the verbenyl group where it is known that such groups as $CH_2=C<$, which absorb in the same region of the spectrum, are absent. Aside from the absorption at 6.03μ, the verbenyl group also shows absorptions at about 8.0μ, 8.2μ and 12.9μ. The bands at about 8μ and at about 12.9μ vary somewhat more than the other two bands in their exact location as shown in Table I, but are nevertheless useful in establishing the presence of a verbenyl group within a molecule when considered together with the bands at 6.03μ and at 8.20μ. Consideration of any single band at one of the wavelengths indicated is not conclusive evidence of the presence of the verbenyl group, but where all four characteristic absorption bands, or all bands not obscured by other and overlapping absorptions, are present, there is no doubt as to the presence of this grouping. Infrared analysis was therefore employed throughout this work to establish conclusively the nature of the products as judged by the presence or absence of absorption bands characteristic of the hydroxyl, ether, aromatic, etc. bands, as well as confirmation of the retention of the verbenyl group during preparation of the ethers.

TABLE I

Wavelengths of characteristic common infrared absorption bands for the verbenyl groups (reported in microns)

| Compound | | | | |
|---|---|---|---|---|
| Cis-Verbenol | 6.03 | 8.00 | 8.20 | 12.86. |
| trans-Verbenol | 6.03 | 7.94 | 8.20 | 12.95. |
| Verbenyl chloride | 6.05 | 7.98 | 8.20 | 12.85. |
| Verbenyl amine | 6.03 | 7.98 | 8.20 | interfering absorptions. |
| Verbenyl dimethyl amine | 6.03 | 7.98 | 8.20 | 12.95. |
| Verbenyl methyl ether | 6.03 | 7.94 | 8.20 | 12.90. |
| Verbenyl isopropyl ether | 6.03 | 7.94 | 8.20 | 12.90. |
| Verbenyl β-hydroxyethyl ether. | 6.03 | 7.94 | 8.20 | 12.90. |
| Diverbenyl ether of ethylene glycol. | 6.03 | 7.94 | 8.20 | 12.90. |
| Verbenyl acetate | 6.03 | (obscured by acetate band). | | 12.87. |
| Verbenyl phenyl ether | 6.03 | (obscured by phenyl ether band). | | 12.85. |
| Verbenyl phenol | 6.03 | 8.00 | 8.20 | 12.95. |

The following examples are illustrative.

EXAMPLE 1

860 grams of methanol containing 10 cc. of concentrated sulfuric acid was charged into a flask equipped with a stirrer, thermometer, and dropping funnel. The mixture was cooled to 22° C. by means of an external cooling bath, and 1000 grams of transverbenol was fed in at such a rate that the temperature was maintained at 22–24° C. When all the verbenol was in, the cooling bath was removed and the mixture allowed to stir for one hour longer at room temperature. 18 grams of NaOH was then added, bringing the mixture to alkalinity. The methanol was distilled off to a pot temperature of 100° C., and the residue washed to neutrality with water. The crude verbenyl methyl ether from this operation amounted to 1029 grams. Dilution of the recovered methanol with water yielded an additional 37 grams of ether, bringing the total yield to 1066, theory=1091 grams. The infrared spectrogram of the product showed it to be an ether with a spectrum much like that of verbenol except that it had ether absorptions instead of hydroxyl absorptions. The crude product resulting from the above steps showed only a trace of unreacted alcohol and was mainly pure verbenyl methyl ether as shown by distillation data collected during the purification.

Verbenyl methyl ether distills at 76.5° C./10 mm., $n_D^{25}$ 1.4685, $\alpha_D$ −100.5° (10 cm. tube), when produced from verbenol, $\alpha_D = -155°$.

EXAMPLE 2

500 grams of the distilled verbenyl methyl ether was heated in a stainless steel bomb for 6 hours at 250° C. The infrared spectrogram showed that the methoxyl group was well retained but that the product was rich in a body having a terminal methylene group. Measurement of the density of the terminal methylene absorption at about 11.0μ showed more than 40% of terminal methylene compound was present. The product was fractionated and most of it distilled between 80 and 84° C. at 10 mm. A fraction boiling at 84° C. at 10 mm., $n_D^{25}$ 1.4742, $\alpha_D$ −65° (10 cm.), which was fairly pure isopiperitenyl methyl ether, was boiled with distilled water for 24 hours, yielding a mixture containing 45% terpene alcohol. From the infrared spectrogram of this hydrolysis product, the presence of isopiperitenol was readily established by comparison with the spectrogram of an authentic sample of isopiperitenol isolated from the pyrolysis products of verbenol and characterized by partial hydrogenation with accompanying loss of terminal methylene absorption to trans-piperitol.

EXAMPLE 3

459 grams of verbenyl methyl ether isomerized for 15 hours at 250° C. showed a terminal methylene absorption in the $9.0\mu$ region by infrared equivalent to approximately 54% of isopiperitenyl methyl ether. This isomerizate was reduced with 5 grams of nickel catalyst under a hydrogen pressure of 1500 p. s. i. g., maximum, at 120° C. until no further hydrogen was absorbed. Comparison of the infrared spectrogram of the reduction product with that of an authentic specimen of isomenthyl methyl ether showed the presence of this compound in substantial quantity.

EXAMPLE 4

Verbenyl methyl ether was oxidized with aqueous sodium dichromate and sulfuric acid whereby verbenone resulted, as shown by comparison of the infrared spectrogram of the oxidation product with that of verbenone.

EXAMPLE 5

91 grams of verbenyl methyl ether was hydrogenated with 0.5 gram platinum oxide catalyst and 50 p. s. i. g. hydrogen pressure, maximum. It hydrogenated readily and accepted a molar equivalent of hydrogen indicating the allylic structure assigned to it. The isolated double bond in the terpene series, when it represents unsaturation of the tri-substituted ethylene type, does not so readily take up hydrogen under the above conditions unless it is part of an allylic system.

EXAMPLE 6

Forty-four grams trans-l-verbenol, $[\alpha]_D$ —155°, was dissolved in 200 cc. toluol, 6.5 grams sodium metal was added, and the mixture stirred and refluxed until the sodium dissolved. The mixture was then cooled and 44 grams methyl iodide added through the condenser. The mixture was then warmed slowly to reflux and the refluxing continued for several hours. Sodium iodide separated. After standing overnight, the mixture was washed with water and the verbenyl methyl ether recovered from the toluol by fractional distillation. The verbenyl methyl ether so produced by this standard synthetic method was identical with that of Example 1, as shown by comparison of their infrared spectrograms and physical properties, thus establishing unequivocally the structure of the ether produced in Example 1.

EXAMPLE 7

Verbenyl methyl ether was prepared as in Example 1, except that 3-pinene-2-ol was used instead of verbenol. The crude yield of verbenyl methyl ether in this case was 1061 grams. Comparison of the infrared spectrogram of this product with those of Examples 1 and 6 established the identity of this product.

EXAMPLE 8

Verbenyl methyl ether was produced by treating a solution of 100 grams verbenol, and 84 grams methanol with 1.5 cc. of boron trifluoride etherate. The mixture was stirred and heated at 50 to 74° C. for 4¾ hours, but samples were taken throughout the reaction and analyzed by infrared methods after removal of methanol by washing. The maximum verbenyl ether content, almost pure verbenyl methyl ether, was found in a sample withdrawn after 10 minutes heating. The infrared absorption spectrogram showed the same product was obtained as in the previous examples.

EXAMPLE 9

300 grams isopropanol, 200 grams verbenol and 4 cc. of concentrated sulfuric acid were stirred for 7 hours, 15 minutes at room temperature. The mixture was then made alkaline with sodium hydroxide and the whole mixture poured into water. 330 grams of oil separated. The verbenyl isopropyl ether was recovered by fractional distillation in good yield. Its boiling point is 86° C. at 10 mm., $n_D^{25}$ 1.463. Its infrared spectrogram shows the absorption bands typical of the verbenyl group, the absorptions characteristic of ethers and the absence of hydroxyl groups.

EXAMPLE 10

250 grams ethylene glycol, 1.5 cc. concentrated sulfuric acid and 300 grams verbenol were stirred at room temperature for one hour. There was a small rise in temperature. Originally homogeneous, the mixture separated into 2 phases. At the end of the stirring period, the acid was neutralized with sodium hydroxide and the whole mixture poured into water. 340 grams of oil separated. The infrared spectrogram showed a product with typical verbenyl absorptions but little unreacted verbenol, a strong ether absorption and strong primary alcohol absorption. On fractionation, the pure mono verbenyl ether of ethylene glycol was obtained in good yield as a distillate boiling at 126° C./10 mm., $n_D^{25}$ 1.4857. The distillation residue was a thin, syrupy liquid containing only a trace of free alcohol. It had absorption characteristics of the verbenyl group, and its ether absorptions were like those of the mono verbenyl ether of ethylene glycol, thus characterizing the higher boiling material as the di-verbenyl ether of ethylene glycol, $n_D^{25}$ 1.4964. This ether was obtained in small yield. The proportions of mono and di-verbenyl ethers can be altered by use of suitable preparative conditions.

23 grams of ethylene glycol mono verbenyl ether was diluted with 25 cc. light petroleum oil and hydrogenated with 0.25 gram of platinum oxide catalyst under a hydrogen pressure of 50 p. s. i. g., maximum. It absorbed one mol of hydrogen quantitatively to give ethylene glycol mono verbenyl ether, $n_D^{25}$ 1.4800. As pointed out in Example 5, the relative ease of hydrogenation of this compound is characteristic of the allylic system.

EXAMPLE 11

200 grams of phenol and 100 grams verbenol were heated for 7 hours on a boiling water bath. The phenol was then removed by extraction with dilute caustic soda and the caustic insoluble portion examined by infrared. The spectrogram showed about 60% of unreacted verbenol and the balance an ether. On distillation, verbenyl phenyl ether, B. P. 120° C. at 2.5 mm., $n_D^{25}$ 1.5211, was recovered.

Verbenyl phenyl ether was characterized by its infrared spectrogram which showed the verbenyl and phenyl absorptions, an ether absorption, but no hydroxyl. Toward the end of the distillation, as the boiling point rose toward 135° at about 1 mm., a higher boiling material distilled and this exhibited a hydroxyl group when examined by infrared methods. The hydroxylic material was readily separated from the verbenyl phenyl ether accompanying it in these higher boiling fractions, by extraction with Claisen's alkali. On dilution of the alkali extract with water and acidification with acetic acid, the verbenyl phenol separated. Its infrared spectrogram showed the verbenyl and phenyl absorptions, hydroxyl, but no ether linkage. It displayed the absorption at $13.3\mu$ which is characteristic of an ortho-substituted phenol. Meta- and para-absorptions were missing. Verbenyl phenyl ether is an allylic phenyl ether and as such undergoes the classical rearrangement to an ortho-allyl-phenol upon heating. This is the source of the verbenyl phenol. o-Verbenyl phenol crystallizes in fine needles. The melting point of a fairly pure specimen was 67–69° C. It is readily soluble in Claisen's alkali or strong aqueous NaOH, from which it separates when sufficiently diluted with water.

EXAMPLE 12

A mixture of 150 grams verbenol, 300 grams cyclohexanol and 2 cc. concentrated sulfuric acid was stirred 3 hours at room temperature and then allowed to stand overnight. The mixture was homogeneous. The following morning, 8 grams of solid potassium hydroxide was added and the mixture stirred until the alkali had dissolved. The mixture was then poured into water and the oil taken up with benzol. After washing well to remove the salt, the benzol was distilled off under vacuum and the crude ether fractionated. About 150 grams of pure verbenyl cyclohexyl ether was recovered from the distillation, together with some unreacted starting material.

The verbenyl cyclohexyl ether boiled at about 140°/10 mm., and had an index of refraction of 1.488 at 25° C. Its infrared absorption spectrogram showed the typical verbenyl absorptions, a strong ether absorption and no hyroxyl group.

EXAMPLE 13

A mixture of 400 grams benzyl alcohol, 160 grams verbenol, $[\alpha]_D = -155°$, and 1 cc. of concentrated sulfuric acid was stirred for one hour at room temperature. The mixture was originally homogeneous but soon developed 2 phases. At the end of the hour stirring, the sulfuric acid was neutralized with excess sodium hydroxide. The crude product was then washed free of salt and fractionated under vacuum to recover the ether.

Verbenyl benzyl ether was recovered in fair yield, as a liquid boiling at about 127° under 3 mm. absolute pressure. It displayed an optical rotation $\alpha_D$ in the 10 cm. tube at 25° C. of −83° and refractive index 1.525 at 25° C. Its infrared absorption spectrogram showed characteristic verbenyl and aromatic absorptions, the strong ether band, but no alcohol. The high refractive index is further evidence of its aromatic nature, and the optical rotation is evidence of its nature as a verbenyl ether.

EXAMPLE 14

150 grams of verbenol and 150 grams of methanol were heated in a stainless steel bomb at 150° C. for 8 hours. After standing overnight, the contents of the bomb were poured into water and 156 grams of oil separated. Its infrared absorption spectrogram showed it consisted of about 50% verbenyl methyl ether, 50% unchanged verbenol.

EXAMPLE 15

150 grams freshly prepared verbenyl chloride, prepared in accordance with Serial No. 388,414, filed September 14, 1953, was added in small portions with cooling to a solution of 98 grams $NH_3$ gas in 500 g. methanol. When the addition was completed, there was no further tendency toward temperature rise. The mixture was then stirred ½ hour at room temperature. A small amount of ammonium chloride separated and was filtered off. Dilution of the filtrate with 2 parts of water yielded 120 g. of oil. Twenty percent of this oil dissolved in dilute acetic acid (10%), indicating that it was an amine, see Serial No. 388,414. The other 80%, when examined by infrared spectrophotometry, showed the characteristic absorptions of verbenyl methyl ether and of another ether. The other ether showed the double absorption between $13\mu$ and $14\mu$ which is characteristic of 3-pipene-2-ol, the allylomer of verbenol, and thereby was characterized as the ether of this form.

The verbenyl chloride used in this example can be prepared by shaking verbenol, its allylomer, 3-pinene-2-ol, or mixtures thereof, with aqueous HCl or by passing dry HCl gas through the alcohol. When optically active verbenol or 3-pinen-2-ol is used, the chloride is optically active and has the same sign as that of the verbenol used and the opposite sign from that of the starting 3-pinene-2-ol. Verbenyl chloride distills at 77° C. at 10 mm. with some decomposition, and is therefore best used without distillation.

Reference is made to the copending application of Bain et al., Serial No. 348,825, filed April 14, 1953, wherein the isopiperitenol, its preparation, and conversion to piperitol referred to herein is more fully described and claimed.

It will be apparent that many variations can be made from the foregoing specific illustrations without departing from the invention. Thus many different alcohols and phenols can be employed to produce a wide variety of ethers and verbenyl phenols. Also a wide variety of the ethers of 3-pinene-2-ol can be prepared by using other alcohols in the Williamson synthesis.

Having described the invention, what is claimed is:

1. Ethers of 3-pinene-2-ol and a hydroxy compound of the formula R—OH in which R is a monovalent radical selected from the class consisting of hydrocarbon radicals, halogen substituted hydrocarbon radicals and hydroxy substituted hydrocarbon radicals.

2. 2-methoxy-3-pinene.

3. o-Verbenyl phenols in which the aromatic radical to which the phenolic hydroxy group is attached is a hydrocarbon radical.

4. o-Verbenyl phenol.

5. The process for preparing verbenyl ethers which consists essentially in bringing together a terpene alcohol selected from the class consisting of verbenol and 3-pinene-2-ol and a hydroxy compound of the general formula R—OH, wherein R is a monovalent radical selected from the class consisting of a hydrocarbon radical, a halogen substituted hydrocarbon radical and a hydroxy substituted hydrocarbon radical under acidic conditions whereby verbenyl ethers are formed.

6. The process of claim 5 in which the reaction is catalyzed by heating.

7. The process of claim 5 in which the ROH compound is an alcohol.

8. The process of claim 5 in which the terpene alcohol is verbenol and the ROH compound is an alcohol.

9. The process of claim 5 in which the terpene alcohol is optically active.

10. The process of claim 9 in which the terpene alcohol is optically active verbenol.

11. The process of claim 5 in which the terpene alcohol is 3-pinene-2-ol.

12. The process of claim 5 in which "R" is a hydrocarbon radical.

13. The process of claim 5 in which the ROH compound is phenol.

14. The process of claim 12 in which the ether initially formed is heated to form ortho-verbenyl phenol.

References Cited in the file of this patent

UNITED STATES PATENTS

| | | |
|---|---|---|
| 2,136,011 | Humphrey | Nov. 8, 1938 |
| 2,145,369 | Osterhof | Jan. 31, 1939 |
| 2,151,769 | Humphrey | Mar. 28, 1939 |
| 2,360,898 | Sarbach | Oct. 24, 1944 |

OTHER REFERENCES

Simonsen: The Terpenes, vol. II (2nd ed.), pp. 214–216 (3 pp.), publ. by Cambridge University Press, London (1949).